under 35 U.S.C. 154(b) by 0 days.

United States Patent
Shimshoni

(10) Patent No.: US 9,432,088 B2
(45) Date of Patent: *Aug. 30, 2016

(54) SECURE NEAR FIELD COMMUNICATION (NFC) HANDSHAKE

(71) Applicant: EMPIRE TECHNOLOGY DEVELOPMENT LLC, Wilmington, DE (US)

(72) Inventor: Daniel S. Shimshoni, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,612

(22) Filed: Aug. 31, 2015

(65) Prior Publication Data

US 2015/0372720 A1    Dec. 24, 2015

Related U.S. Application Data

(63) Continuation of application No. 13/980,041, filed as application No. PCT/US2013/024768 on Feb. 5, 2013, now Pat. No. 9,154,191.

(51) Int. Cl.
*H04B 5/00* (2006.01)
*H04W 12/04* (2009.01)
*H04W 4/00* (2009.01)

(52) U.S. Cl.
CPC .......... *H04B 5/0031* (2013.01); *H04B 5/0056* (2013.01); *H04W 4/008* (2013.01); *H04W 12/04* (2013.01)

(58) Field of Classification Search
CPC .................................................. H04B 5/0031
USPC ........... 455/41.1, 41.2, 90.1, 410, 411, 412.1
See application file for complete search history.

(56) References Cited

U.S. PATENT DOCUMENTS

| | | |
|---|---|---|
| 2004/0172339 A1 | 9/2004 | Snelgrove et al. |
| 2009/0073070 A1 | 3/2009 | Rofougaran |
| 2009/0189813 A1 | 7/2009 | Haas et al. |
| 2010/0043061 A1 | 2/2010 | Martin et al. |

(Continued)

FOREIGN PATENT DOCUMENTS

| | | |
|---|---|---|
| WO | 2009001090 A1 | 12/2008 |
| WO | 2013009288 A1 | 1/2013 |

OTHER PUBLICATIONS

Cai, L., et al., "Good Neighbor: Ad Hoc Pairing of Nearby Wireless Devices by Multiple Antennas," Proceedings of the Network and Distributed System Security Symposium, NDSS, pp. 1-20 (Feb. 6-9, 2011).

(Continued)

*Primary Examiner* — Tuan H Nguyen
(74) *Attorney, Agent, or Firm* — Turk IP Law, LLC

(57) ABSTRACT

Technologies are presented for securing NFC exchange through movement of at least one of the communicating devices. In some examples, a first device, utilizing a communication module and a processor, may transmit an initial NFC handshake signal as the first device is being moved relative to a second device. The second device, utilizing a communication module, two or more antennae, and a processor, may receive the initial NFC handshake signal from the first device. Each device may record a movement of the first device. The second device may transmit a message to the first device that includes a recording of the movement at the second device and a temporary secret. Once the first device determines that the movement recorded at the second device matches the movement recorded at the first device, the first device may use the temporary secret to encrypt further communication with the second device.

20 Claims, 7 Drawing Sheets

(56) References Cited

U.S. PATENT DOCUMENTS

| | | | | |
|---|---|---|---|---|
| 2011/0117841 | A1* | 5/2011 | Thorn | G06F 1/1626 455/41.2 |
| 2012/0254032 | A1* | 10/2012 | Carbonell Duque | G06Q 20/3278 705/44 |
| 2012/0309354 | A1 | 12/2012 | Du | |

OTHER PUBLICATIONS

Haselsteiner, E., and Breitfuβ, K., "Security in Near Field Communication (NFC)," Philips Semiconductors, Workshop on RFID Security, pp. 1-11 (2006).

International Search Report and Written Opinion for International Publication No. PCT/US2013/024768 mailed on Apr. 15, 2013.

Mulliner, C., "Vulnerability Analysis and Attacks on NFC-Enabled Mobile Phones," IEEE International Conference on Availability, Reliability and Security, pp. 695-700 (Mar. 16-19, 2009).

Tsirline, B.Y., "Spatially Selective Antenna for Very Close Proximity HF RFID Applications—Part 1," High Frequency Electronics, pp. 18-28 (Feb. 2007).

International Preliminary Report on Patentability for PCT/US2013/024768 filed Feb. 5, 2013, mailed on Aug. 20, 2015, issued Aug. 11, 2015.

* cited by examiner

COMPUTER PROGRAM PRODUCT 700

SIGNAL-BEARING MEDIUM 702

704 AT LEAST ONE OF

ONE OR MORE INSTRUCTIONS FOR TRANSMITTING INITIAL HANDSHAKE FROM MOBILE DEVICE WHILE IT IS MOVED;
    ONE OR MORE INSTRUCTIONS FOR RECORDING MOVEMENT OF MOBILE DEVICE ON BOTH DEVICES;
    ONE OR MORE INSTRUCTIONS FOR RECEIVING MESSAGE FROM SECOND DEVICE WITH RECORD OF MOVEMENT AND SECRET; AND
    ONE OR MORE INSTRUCTIONS FOR IF MOVEMENT RECORDS MATCH, CONTINUING COMMUNICATION ENCRYPTING COMMUNICATION WITH RECEIVED SECRET.

| COMPUTER-READABLE MEDIUM 706 | RECORDABLE MEDIUM 708 | COMMUNICATIONS MEDIUM 710 |
|---|---|---|

FIG. 7

SECURE NEAR FIELD COMMUNICATION (NFC) HANDSHAKE

CROSS-REFERENCE TO RELATED APPLICATIONS

This Application is a continuation under 35 U.S.C. §120 of U.S. patent application Ser. No. 13/980,041 filed on Jul 16, 2013, now U.S. Pat. No. 9,154,191, issued on Oct. 6, 2015, which is the National Stage filing under 35 U.S.C. §371 of PCT application Ser. No. PCT/US13/24768 filed on Feb 5, 2013 . The disclosures of the U.S. Patent Application and the PCT application are hereby incorporated by reference in their entireties.

BACKGROUND

Unless otherwise indicated herein, the materials described in this section are not prior art to the claims in this application and are not admitted to be prior art by inclusion in this section.

Near field communication (NFC) may establish radio communication between two or more communication devices that are in close proximity. NFC standards may cover communications protocols and data exchange formats, and may be based on existing radio-frequency identification (RFID) standards. NFC may build upon RFID systems by allowing two-way communication between endpoints. Present applications may include contactless transactions, data exchange, and simplified setup of more complex communications, such as Wi-Fi.

Near Field Communication (NFC) may be vulnerable to an array of attacks ranging from malicious URI spoofing to denial of service. Many attacks may be similar to those that exist on the Web. In addition, NFC often relies on proximity as an ad-hoc authentication mechanism and a way to establish trust between two NFC exchange partners. The man-in-the-middle attack may be prevalent in the usage case. The NFC protocol does not address the issue beyond the assumption that NFC uses low-power transmission that may only be received from a very short distance. However, an attacker may use high gain antennae or a high power transmitter that can transmit and receive signals at a greater distance, allowing the attacker, located a further distance away, to intercept communication between two legitimate NFC exchange partners, steal sensitive information and inject malicious data.

SUMMARY

The present disclosure generally describes techniques for providing secure near field communication (NFC) handshake among devices.

According to some examples, a method is described for providing a secure near field communication (NFC) handshake. The method may include a first device transmitting an initial NFC handshake signal, while the first device is being moved relative to a second device. The method may also include the first device recording a movement of the first device and receiving a message from the second device that includes a recording of the movement at the second device and a temporary secret. The method may further include the first device receiving the temporary secret to encrypt further communication with the second device if the movement recorded at the second device matches the movement recorded at the first device.

According to other examples, a method is described for providing a secure near field communication (NFC) handshake. The method may include a second device receiving an initial NFC handshake signal from a first device while the first device is being moved relative to the second device. The method may also include the second device recording a movement of the first device and transmitting a message that includes a recording of the movement at the second device and a temporary secret. The method may further include the second device receiving further NFC communication from the first device encrypted with the temporary secret if the movement recorded at the second device matches the movement recorded at the first device.

According to some embodiments, a mobile device is described for providing a secure near field communication (NFC) handshake. The mobile device may include a communication module configured to exchange NFC signals and a processor. The processor may transmit an initial NFC handshake signal from the mobile device while the mobile device is being moved relative to a second device; record a movement of the mobile device; and/or receive a message from the second device that includes a recording of the movement at the second device and a temporary secret. If the movement recorded at the second device matches the movement recorded at the mobile device, the processor may use the received temporary secret to encrypt further communication with the second device.

According to other embodiments, a stationary device is described for providing a secure near field communication (NFC) handshake. The stationary device may include a communication module configured to exchange NFC signals, two or more antennae, and a processor. The processor may receive an initial NFC handshake signal from a mobile device while the mobile device is being moved relative to the stationary device; record a movement of the mobile device at the stationary device; and/or transmit a message from the stationary device that includes a recording of the movement at the stationary device and a temporary secret. If the movement recorded at the stationary device matches the movement recorded at the mobile device, the processor may receive further NFC communication from the mobile device encrypted with the temporary secret.

According to further embodiments, a computer readable storage medium is described with instructions stored thereon, which when executed on one or more computing devices may execute a method for providing secure Near Field Communication (NFC) exchange. The method may be similar to the method described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
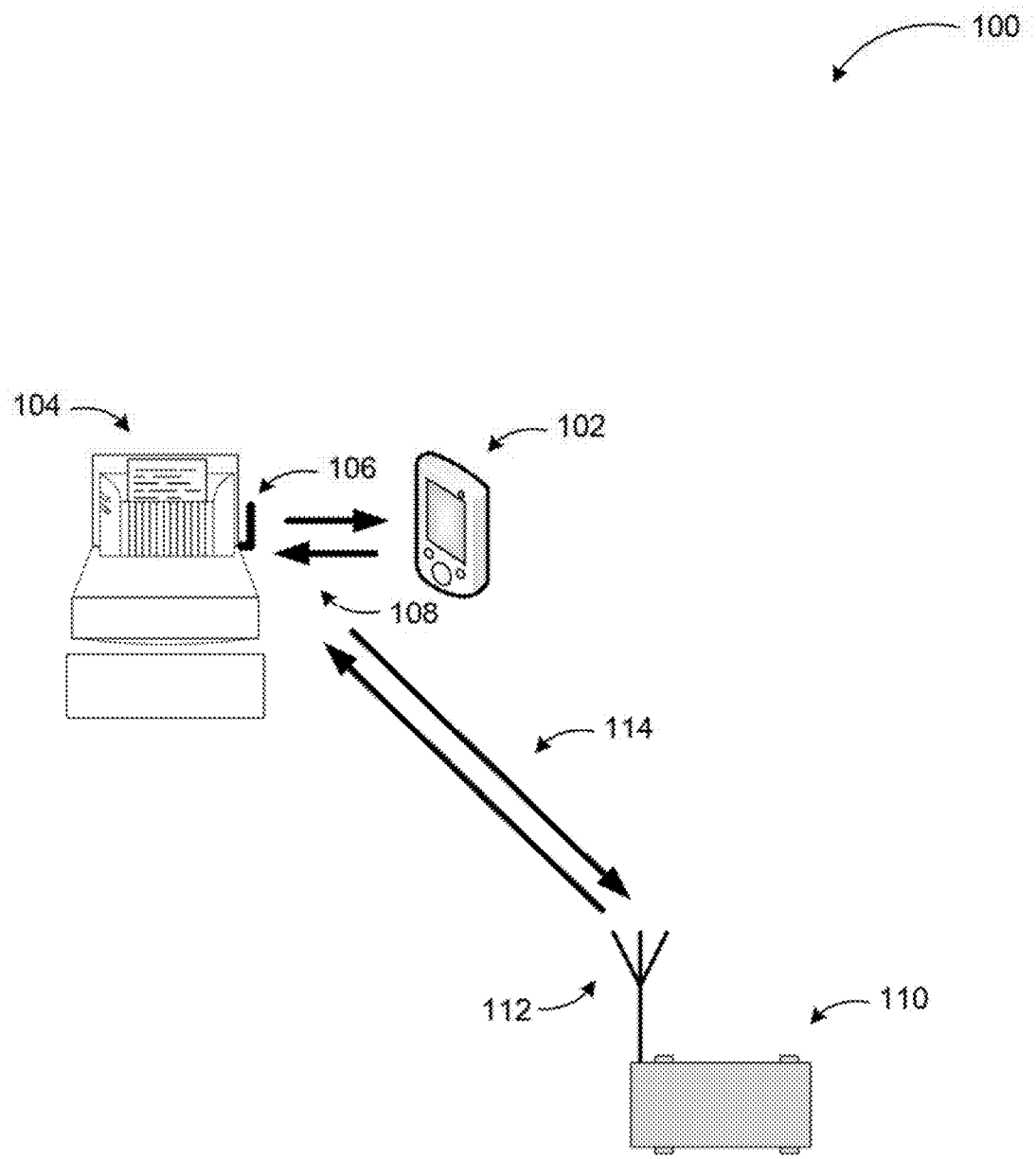
FIG. 1 illustrates an example system employing NFC, which may be vulnerable to an attack.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to securing NFC exchange through movement of at least one of the communicating devices.

Briefly stated, technologies are generally described for securing NFC exchange through movement of at least one of the devices communicating via NFC. A first device, utilizing a communication module and a processor, may transmit an initial NFC handshake signal as the first device is being moved relative to a second device. The second device, utilizing a communication module, two or more antennae, and a processor, may receive the initial NFC handshake signal from the first device. Each device may record a movement of the first device. The second device may transmit a message to the first device that includes a recording of the first device's movement at the second device and a temporary secret. Once the first device determines that the first device's movement recorded at the second device matches the first device's movement recorded at the first device, the first device may use the temporary secret to encrypt further communication with the second device.

FIG. 1 illustrates an example system employing NFC, which may be vulnerable to an attack, arranged in accordance with at least some embodiments described herein.

As shown in a diagram 100, a mobile device 102 and a stationary device 104 possessing a single antenna 106 may be transmitting and receiving NFC signals 108 in mutual exchange. A third party device 110 may use a high gain antenna 112 or a high power transmitter that can transmit and receive signals at a greater distance, to intercept (114) the NFC signals 108 between two legitimate NFC exchange partners, steal sensitive information and inject malicious data, etc.

Securing NFC may rely on the use of encryption keys. The key exchange in an ad hoc situation may involve positive identification of the key users in order to prevent sending sensitive information inadvertently to an attacker using the attacker's encryption key. To illustrate, a first user, who may have a mobile device, may wish to share sensitive information with a second user, who may have a stationary device. The mobile device may send the stationary device an encryption key (public key) and the stationary device may reciprocate. A third device, located a relatively larger distance away with a high gain antenna or a high power transmitter may intercept the key exchange and send a separate key, which may be unknowingly used to transmit sensitive data. If the third device is able to transmit the separate key to the mobile device, then the mobile device may be at risk of encoding private information using the third device's key. This may then give a third party access to the first user's information.

Figure 2:
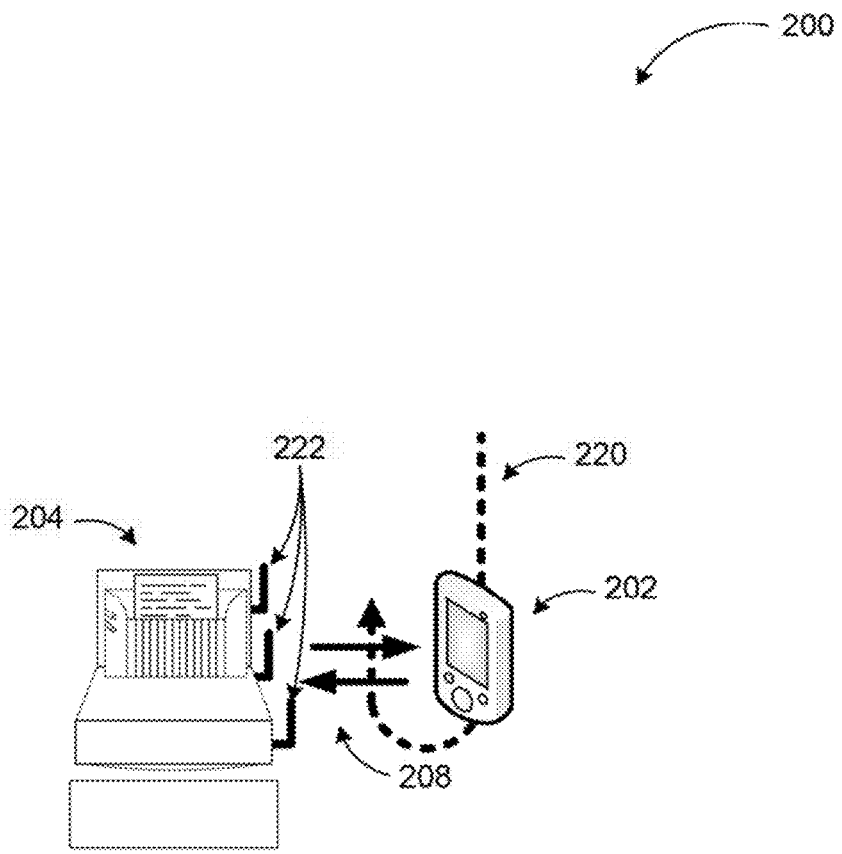
FIG. 2 illustrates an example system for secure NFC exchange employing relative position movement of one of the communicating devices.

FIG. 2 illustrates an example system for secure NFC exchange employing relative position movement of one of the communicating devices, arranged in accordance with at least some embodiments described herein.

As shown in a diagram 200, a mobile device 202 may securely transmit an NFC signal 208 to a stationary device 204 using a movement 220 of the mobile device 202 in relation to the stationary device 204, possessing two or more antennae 222. During the handshake, the mobile device 202 may be moved according to a predefined or random pattern by its user. The stationary device 204 may detect this movement through the variation of received signal strength at its multiple antennae 222, for example, and record.

According to the conventional NFC systems that use a single antenna, it is possible to remotely simulate a transmission. By using two or more antennae and adding a verification layer, a receiving device may be able to verify the identity of a transmitting device. The verification layer may expect differential signal strength at the two or more antennae 222, which may correspond to a defined spatial relationship between the transmitting and the receiving devices.

According to an example scenario, even if two devices involved in mutual NFC exchange are closer together than a third device, the third device may have a more powerful transmitter that can be used to modulate the signal. However, if at least one of the two devices use two or more antennae, then as the first user moves his/her device, the signal may be received at different strengths through each antenna depending on the first device's spatial relationship to the two or more receiving antennae. The relative position of the first device may then be estimated at the second device based on a difference of received signal strength through the different antennae. The antennae may have substantially similar or different gains, which may be taken into account in the computation. While the third device may interfere by modulating one of the exchanged signals from a distance as discussed above, it may be difficult, if at all possible, for it to emulate such a relative position change: the stronger the signal the smaller the relative differences, and the longer the distance, the smaller the perspective. The first and second devices may, therefore, securely identify each other.

Based on the relative changes in signal strength received in the two or more antennae, the second device may be able to record the first device's movement in proximity to the antennae. In some examples, a similar principle may be applied to the first device, which has one antenna. Each of the second device's two or more antennae, in addition to receiving signals, may emit distinct signals. The distinction between characteristics of the signals may be in transmitted signal power, frequency, phase, or even modulation. Depending on the first device's position between the two or more antennae, the characteristic of the signal received from each one of antennae may vary. Thus, the first device may record its own movement in relation to the second device.

Figure 3:
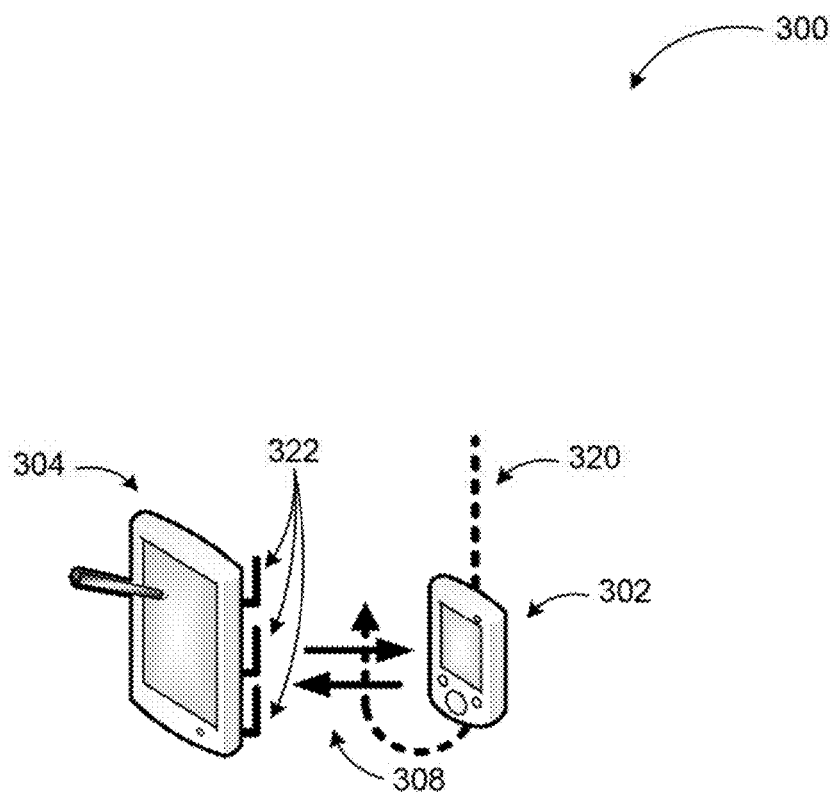
FIG. 3 illustrates an example system for secure NFC exchange employing relative position movement of one or both of the communicating devices.

FIG. 3 illustrates an example system for secure NFC exchange employing relative position movement of one or both of the communicating devices, arranged in accordance with at least some embodiments described herein.

As shown in a diagram 300, a first mobile device 302 may securely transmit an NFC signal 308 to a second mobile device 304 through a movement 320 of the first mobile device in relation to the second mobile device 304, possessing two or more antennae 322.

According to some embodiments, the configuration shown in the diagram 300 may achieve secure NFC exchange similar to the configuration of the diagram 200 in FIG. 2. The NFC exchange in the diagram 300 may include an interaction between two mobile devices, while the configuration in the diagram 200 may include interaction between a mobile and a stationary device.

Embodiments are not limited to the examples shown above. Stationary and mobile devices using any number of antennae may achieve secure NFC handshake by employing recordation of a movement of at least one of the devices.

Figure 4:
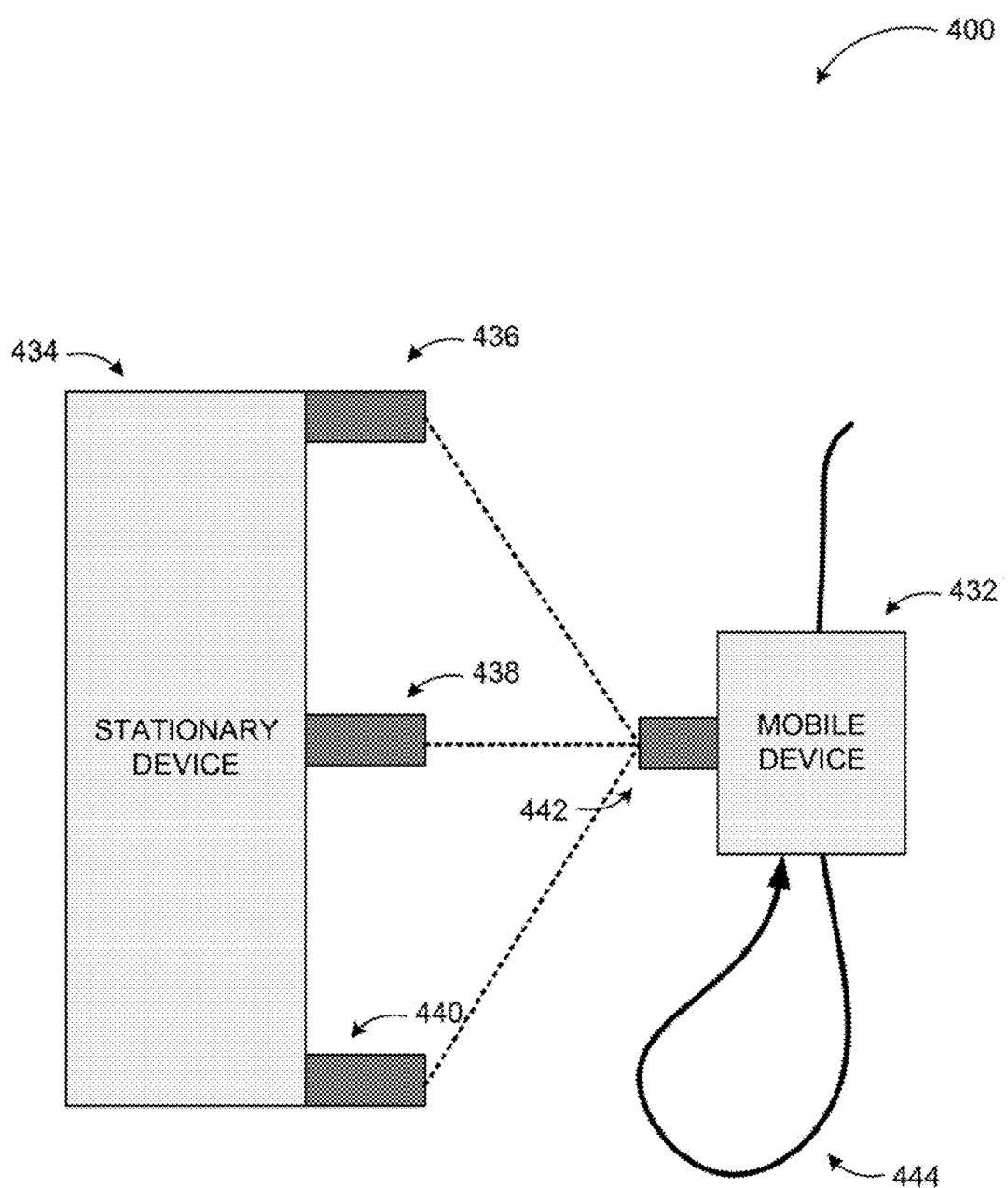
FIG. 4 illustrates an example diagram of securing NFC exchange through movement of one of the communicating devices.

FIG. 4 illustrates an example diagram of securing NFC exchange through movement of one of the communicating devices, arranged in accordance with at least some embodiments described herein.

As shown in a diagram 400, a mobile device 432 possessing a single antenna 442 and a stationary device 434 possessing two or more antennae 436, 438, and/or 440 may secure NFC exchange through a movement 444 of the mobile device 432.

According to some examples, a method for securing NFC exchange may happen as follows: a first device, in close proximity to a second device, may transmit a handshake signal, which includes a public key. The second device may detect the signal and emit two or more distinct signals utilizing two or more antennae. The first device may be moved relative to the second device according to a pattern selected by the user of the first device, where the pattern may also be a random pattern. A movement may be recorded by both the first and second devices. The second device, having detected the relative movement in the space between its two or more antennae, may be certain that the signal came from the first device and not from a third device. The second device may detect the movement of the first device through the variation of received signal strength at its multiple antennae, for example. The second device may use the first device's public key to encrypt a message that contains the first device's movement pattern as recorded and a temporary shared secret. The first device may then compare the movement pattern sent by the second device with the movement it recorded. If the pattern matches, then the first device may also be certain that the message was received from the second device. The third device may have intercepted the first device's public key, but may be incapable of recording the first device's movement between the second device's two or more antennae, so any pattern that the third device may send to the first device would not match.

The first device, that now has proof that the received message came from the second device, may use the second device's temporary secret to encrypt a confirmation message back to the second device. Subsequent communication during this session may be encrypted using the temporary secret. Since the secret was sent from the second to the first device using the first device's public key, the secret is unbeknownst to the third device. As such, the third device may not be able to read the contents of the first and second devices' messages or send messages to them.

Figure 5:
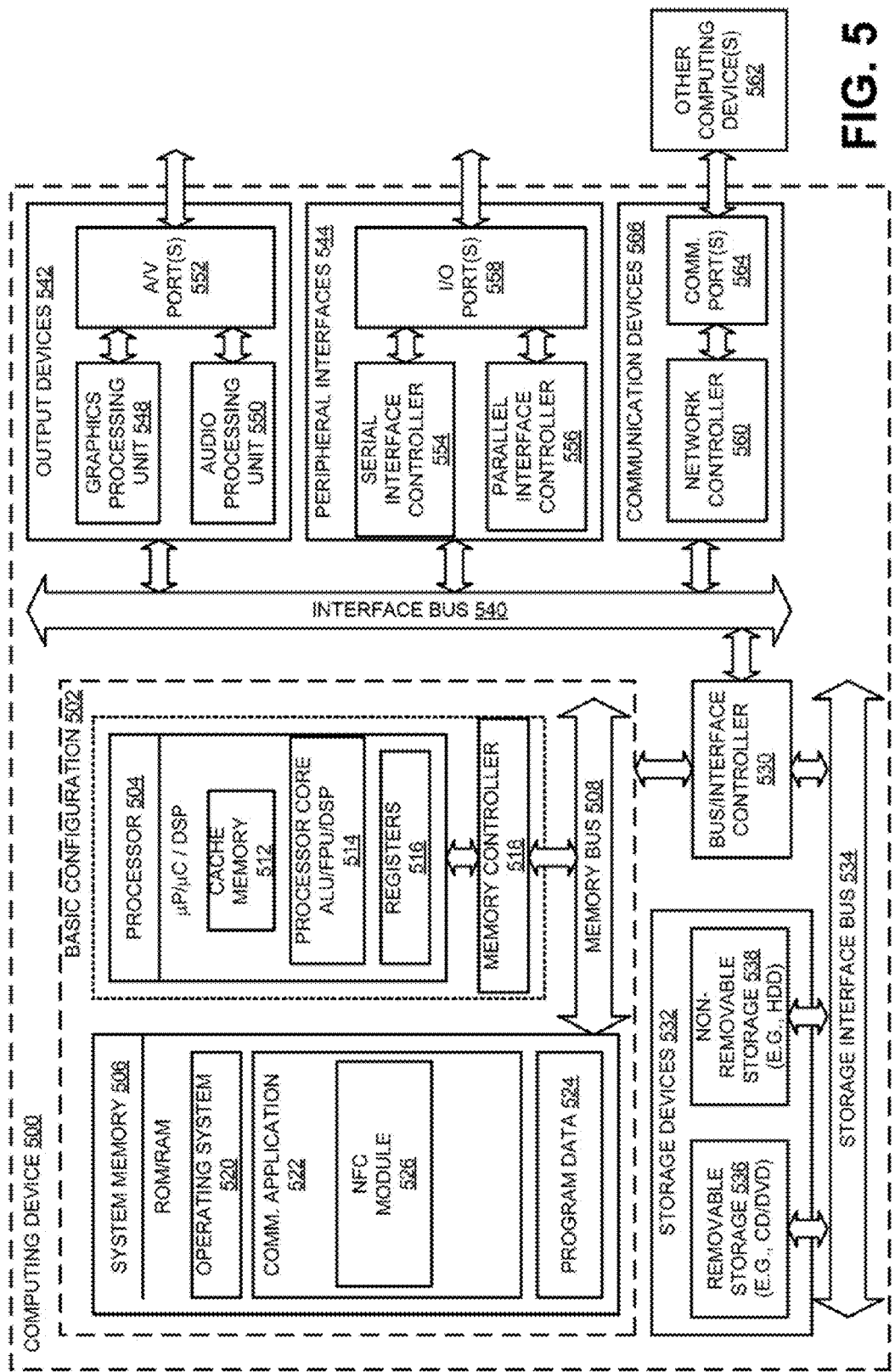
FIG. 5 illustrates a general purpose computing device, which may be used to secure NFC exchange through movement of at least one of the communicating devices.

FIG. 5 illustrates a general purpose computing device, which may be used to secure NFC exchange through movement of at least one of the communicating devices, arranged in accordance with at least some embodiments described herein.

For example, the computing device 500 may be used to exchange NFC signals as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application 522, and program data 524. The communication application 522 may include an NFC module 526 to exchange NFC signals as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a computer including both laptop computer and non-laptop computer configurations.

Example embodiments may also include methods for managing compound certification for assurance without revealing infrastructure. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by preselected criteria that may be machine automated.

Figure 6:
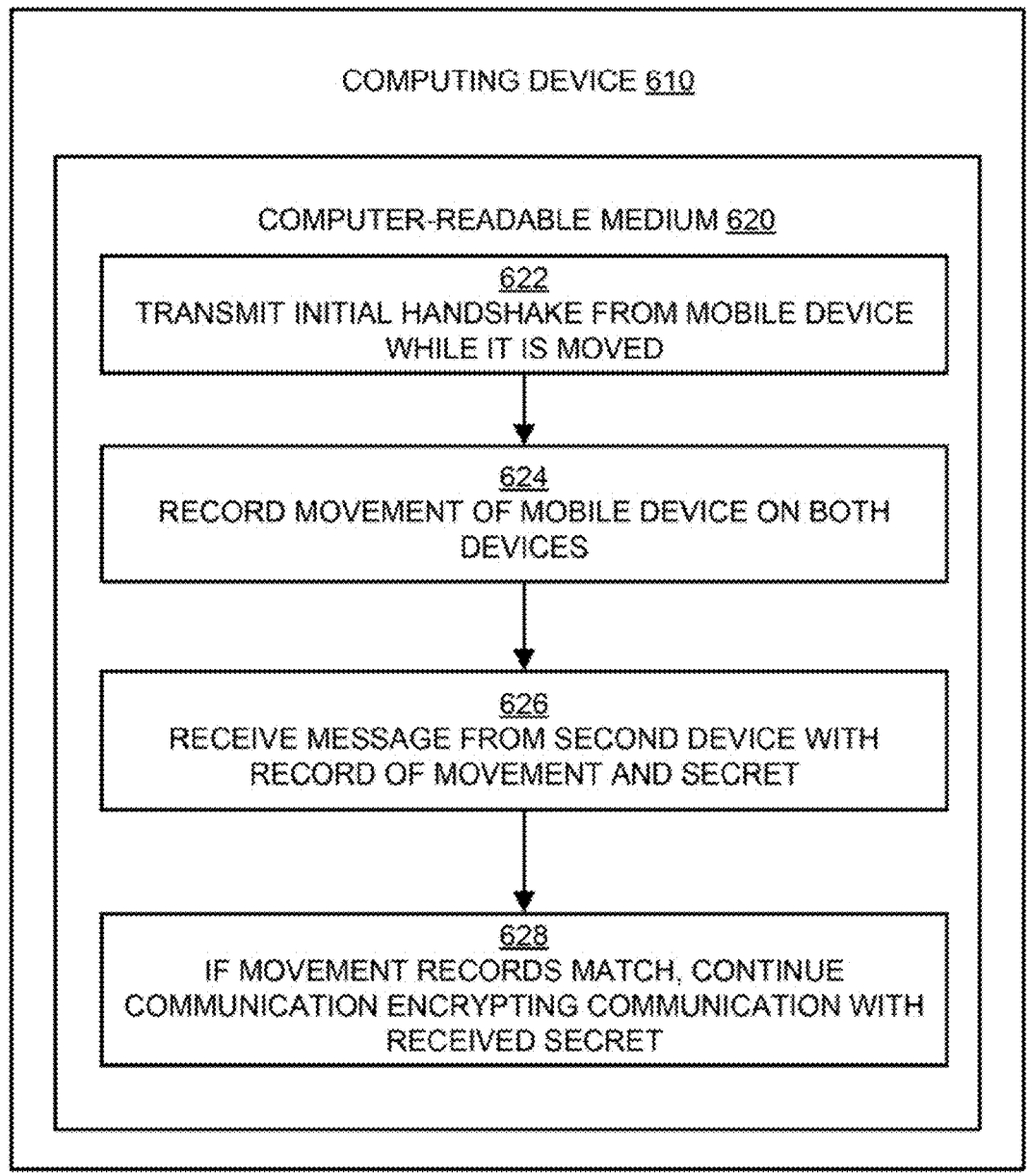
FIG. 6 is a flow diagram illustrating an example method for securing NFC exchange through movement of at least one of the communicating devices that may be performed by a computing device such as the computing device in FIG. 5.

FIG. 6 is a flow diagram illustrating an example method for securing NFC exchange through movement of at least one of the communicating devices that may be performed by a computing device such as the computing device in FIG. 5, arranged in accordance with at least some embodiments described herein.

Example methods may include one or more operations, functions or actions as illustrated by one or more of blocks 622, 624, 626 and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for securing NFC exchange may begin with block 622, "TRANSMIT INITIAL HANDSHAKE FROM MOBILE DEVICE WHILE IT IS MOVED", where the processor 504 may transmit an NFC signal 208 from the mobile device 202, while the mobile device 202 is being moved relative to the stationary device 204.

Block 622 may be followed by block 624, "RECORD MOVEMENT OF MOBILE DEVICE ON BOTH DEVICES", where the respective processors of each device may record the movement 220 of the mobile device 202.

Block 624 may be followed by block 626, "RECEIVE MESSAGE FROM SECOND DEVICE WITH RECORD OF MOVEMENT AND SECRET", where the processor 504 of the mobile device 202 may receive a message from the stationary device 204 that includes a recording of the movement 220 at the stationary device 204 and a temporary secret.

Block 626 may be followed by block 628, "IF MOVEMENT RECORDS MATCH, CONTINUE COMMUNICATION ENCRYPTING COMMUNICATION WITH RECEIVED SECRET", where the processor 504 of the mobile device 202 may determine whether the mobile device's movement recorded at the stationary device 204 matches the mobile device's movement recorded at the mobile device 202. If the processor 504 of the mobile device 202 determines that the mobile device's movement recorded at the stationary device 204 matches the mobile device's movement recorded at the mobile device 202, then the processor 504 of the mobile device 202 may use the received temporary secret to encrypt further communication with the stationary device 204.

FIG. 7 illustrates a block diagram of an example computer program product, all arranged in accordance with at least some embodiments described herein.

In some examples, as shown in FIG. 7, the computer program product 700 may include a signal bearing medium 702 that may also include one or more machine readable instructions 704 that, when executed by, for example, a processor may provide the functionality described herein. Thus, for example, referring to the processor 504 in FIG. 5, the communication application 522 or the NFC module 526 may undertake one or more of the tasks shown in FIG. 7 in response to the instructions 704 conveyed to the processor 504 by the medium 702 to perform actions associated with securing NFC exchange through movement of at least one of the communicating devices as described herein. Some of those instructions may include, for example, transmitting initial handshake from mobile device while it is moved, recording movement of mobile device on both devices, receiving message from second device with record of movement and secret, and if movement records match, continuing communication encrypting communication with received secret, according to some embodiments described herein.

In some implementations, the signal bearing medium 702 depicted in FIG. 8 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard)

According to some examples, a method is described for providing a secure near field communication (NFC) handshake. The method may include a first device transmitting an initial NFC handshake signal, while the first device is being moved relative to a second device. The method may also include the first device recording a movement of the first device and receiving a message from the second device that includes a recording of the movement at the second device and a temporary secret. The method may further include the first device receiving the temporary secret to encrypt further communication with the second device if the movement recorded at the second device matches the movement recorded at the first device.

According to other examples, recording the movement of the first device may employ an accelerometer integrated into the device and may be based on two or more distinct signals transmitted from respective two or more antennae of the second device. The signal strength of each distinct signal at the first device may be determined and a public encryption key may be transmitted with the initial handshake signal, where the message from the second device is encrypted with the public encryption key.

According to further examples, the movement of the first device may be according to a random pattern and the temporary secret may be used for a single NFC session. The movement of the first device may also be according to a predefined pattern and the temporary secret may be used for multiple NFC sessions. The first device may be a mobile device and the second device may be a stationary device; the first device and the second device may both be mobile devices; or the first device may be a smartphone, a tablet computer, a laptop computer, a mobile computer, a handheld computer, or a wearable computer.

According to some embodiments, a method is described for providing a secure near field communication (NFC) handshake. The method may include a second device receiving an initial NFC handshake signal from a first device while the first device is being moved relative to the second device. The method may also include the second device recording a movement of the first device and transmitting a message that includes a recording of the movement at the second device and a temporary secret. The method may further include the second device receiving further NFC communication from the first device encrypted with the temporary secret if the movement recorded at the second device matches the movement recorded at the first device.

According to other embodiments, detecting the movement of the first device at the second device may be based on detecting a signal strength received at two or more antennae of the second device and transmitting the message may employ two or more distinct signals from respective two or more antennae of the second device. The movement of the first device may be according to a random pattern and the temporary secret may be used for a single NFC session. The movement of the first device may also be according to a predefined pattern and the temporary secret may be used for multiple NFC sessions. The first device may be a mobile device and the second device may be a stationary device; the first device and the second device may both be mobile devices; or the first device may be a smartphone, a tablet computer, a laptop computer, a mobile computer, a handheld computer, or a wearable computer. The second device may be a point of sale (POS) device.

According to further embodiments, a mobile device is described for providing a secure near field communication (NFC) handshake. The mobile device may include a communication module configured to exchange NFC signals and a processor. The processor may transmit an initial NFC handshake signal from the mobile device while the mobile device is being moved relative to a second device; record a movement of the mobile device; and/or receive a message from the second device that includes a recording of the movement at the second device and a temporary secret. If the movement recorded at the second device matches the movement recorded at the mobile device, the processor may use the received temporary secret to encrypt further communication with the second device.

According to yet further embodiments, the processor may record the movement of the mobile device by employing an accelerometer integrated into the mobile device, based on two or more distinct signals transmitted from respective two or more antennae of the second device; determine a signal strength of each distinct signal; and/or transmit a public encryption key with the initial handshake signal, where the message from the second device is encrypted with the public encryption key. The movement of the mobile device may be according to a random pattern and the temporary secret may be used for a single NFC session. The movement of the mobile device may also be according to a predefined pattern and the temporary secret may be used for multiple NFC sessions. The second device may be a stationary device or a mobile device, and the mobile device may a smartphone, a tablet computer, a laptop computer, a mobile computer, a handheld computer, or a wearable computer.

According to other embodiments, a stationary device is described for providing a secure near field communication (NFC) handshake. The stationary device may include a communication module configured to exchange NFC signals, two or more antennae, and a processor. The processor may receive an initial NFC handshake signal from a mobile device while the mobile device is being moved relative to the stationary device; record a movement of the mobile device at the stationary device; and/or transmit a message from the stationary device that includes a recording of the movement at the stationary device and a temporary secret. If the movement recorded at the stationary device matches the movement recorded at the mobile device, the processor may receive further NFC communication from the mobile device encrypted with the temporary secret.

According to other examples, the processor may further detect the movement of the mobile device at the stationary device based on detecting a signal strength received at the two or more antennae of the stationary device, and transmit the message employing two or more distinct signals from respective two or more antennas of the stationary device. The movement of the mobile device may be according to a random pattern and the temporary secret may be used for a single NFC session. The movement of the mobile device may also be according to a predefined pattern and the temporary secret may be used for multiple NFC sessions. The mobile device may be a smartphone, a tablet computer, a laptop computer, a mobile computer, a handheld computer, or a wearable computer. The stationary device may be a point of sale (POS) device and/or may include three or more antennae.

According to further examples, a computer readable storage medium with instructions stored thereon, which when executed on one or more computing devices may execute a method for providing secure Near Field Communication (NFC) exchange. The method may be similar to the method described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and or processes via the use of block diagrams, flowcharts, and/or examples. Insofar as such block diagrams, flowcharts, and/or examples contain one or more functions and or operations, it will be understood by those within the art that each function and/or operation within such block diagrams, flowcharts, or examples may be implemented, individually and or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and or control systems including feedback loops and control motors (e.g., feedback for sensing position and/or velocity of gantry systems; control motors for moving and/or adjusting components and or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide secure Near Field Communication (NFC) exchange, the method comprising:
   transmitting, by a first device, an initial NFC handshake signal while the first device is being moved relative to a second device, wherein the second device is configured to verify an identity of the first device through one or more antennas of the second device;
   recording, by the first device, a first movement of the first device that employs an accelerometer integrated into the first device;
   receiving, by the first device, a message from the second device that includes a recording of a second movement at the second device and a temporary secret; and
   in response to a determination that the second movement recorded at the second device matches the first movement recorded at the first device, using, by the first device, the temporary secret to encrypt a confirmation message to send to the second device, wherein the confirmation message includes the first movement of the first device.

2. The method of claim 1, further comprising:
   recording, by the first device, the first movement of the first device based on one or more distinct signals transmitted from the one or more antennas of the second device.

3. The method of claim 2, further comprising:
   estimating a relative position of the first device at the second device based on a difference of received signal strength through the one or more antennas of the second device.

4. The method of claim 1, wherein the first movement of the first device occurs according to a random pattern and the temporary secret is used for a single NFC session.

5. The method of claim 1, wherein the first movement of the first device occurs according to a pattern and the temporary secret is used for multiple NFC sessions.

6. The method of claim 1, further comprising:
   recording, by the first device, the first movement of the first device based on two or more signals transmitted from respective two or more antennas of the second device.

7. The method of claim 6, further comprising:
confirming, by a verification layer of the second device, the identity of the first device associated with the first movement by a process that includes:
identifying a spatial relationship between the first device and the second device; and
identifying a differential signal strength at the two or more antennas of the second device.

8. The method of claim 7, further comprising:
in response to a determination that the spatial relationship matches the differential signal strength, confirming the identity of the first device associated with the first movement.

9. A system to provide secure Near Field Communication (NFC) exchange, the system comprising:
a first device configured to:
transmit, to a second device, an initial NFC handshake signal while the first device is being moved relative to the second device, wherein the second device is configured to verify an identity of the first device through one or more antennas of the second device; and
record a first movement that employs an accelerometer integrated into the first device;
a second device configured to:
receive the initial NFC handshake signal from the first device; and
transmit a message to the first device, wherein the message includes a recording of a second movement at the second device and a temporary secret; and
the first device configured to:
receive the message from the second device.

10. The system of claim 9, wherein the first device is further configured to:
transmit, to the second device, a public key encryption with the initial NFC handshake signal.

11. The system of claim 10, wherein the second device is further configured to:
encrypt a message using the public key; and
transmit the encrypted message to the first device.

12. The system of claim 11, wherein the first device is further configured to:
compare the second movement received from the second device with the first movement recorded at the first device.

13. The system of claim 12, wherein the first device is further configured to:
in response to a determination that the first movement recorded at the first device and the second movement recorded at the second device matches,
confirm the message as being received from the second device; and
use the temporary secret to encrypt a confirmation message to send to the second device, wherein the confirmation message includes the first movement of the first device.

14. The system of claim 9, wherein the first device is further configured to:
record the first movement of the first device based on two or more signals transmitted from respective two or more antennas of the second device.

15. The system of claim 14, wherein the first device is further configured to:
identify characteristics of the two or more signals, wherein the characteristics of the two or more signals include one or more of: a transmitted signal power, a frequency, a phase, and a modulation; and
distinguish the two or more signals by the characteristics.

16. The system of claim 14, wherein the second device is further configured to:
confirm, by a verification layer of the second device, the identity of the first device associated with the first movement by a process that includes:
identifying a spatial relationship between the first device and the second device;
identifying a differential signal strength at the two or more antennas of the second device; and
in response to a determination that the spatial relationship matches the differential signal strength, confirming the identity of the first device associated with the first movement.

17. A computer-readable storage device having instructions stored thereon to provide secure Near Field Communication (NFC) exchange, the instructions comprising:
transmitting, by a first device, an initial NFC handshake signal while the first device is being moved relative to a second device, wherein the second device is configured to verify an identity of the first device through one or more antennas of the second device;
recording, by the first device, a first movement of the first device that employs an accelerometer integrated into the first device;
receiving, by the first device, a message from the second device that includes a recording of a second movement at the second device and a temporary secret, wherein the temporary secret is used for one of a single NFC session and multiple NFC sessions; and
in response to a determination that the second movement recorded at the second device matches the first movement recorded at the first device, using, by the first device, the temporary secret to encrypt a confirmation message to send to the second device, wherein the confirmation message includes the first movement of the first device.

18. The computer-readable storage device of claim 17, wherein the instructions further comprise:
recording, by the first device, the first movement of the first device based on one or more distinct signals transmitted from the one or more antennas of the second device; and
estimating a relative position of the first device at the second device based on a difference of received signal strength through the one or more antennas of the second device.

19. The computer-readable storage device of claim 17, wherein the instructions further comprise:
transmitting, by the first device to the second device, a public key encryption with the NFC handshake signal;
encrypting, by the second device, a message using the public key; and
transmitting, by the second device, the encrypted message to the first device.

20. The computer-readable storage device of claim 19, wherein the instructions further comprise:
comparing the second movement received from the second device with the first movement recorded at the first device;
in response to a determination that the first movement recorded at the first device and the second movement recorded at the second device matches,
confirming the message as being received from the second device; and using the temporary secret to encrypt a confirmation message to send to the second device, wherein the confirmation message includes the first movement of the first device; and recording the first movement of the first device based on two or more signals transmitted from respective two or more antennas of the second device.

\* \* \* \* \*